United States Patent Office 2,930,796
Patented Mar. 29, 1960

2,930,796

CONDITIONING OF CRUDE POLYCHLORO COPPER PHTHALOCYANINES

Leon Katz, Springfield, James Gannon, Newark, and Robert E. Brouillard, Westfield, N.J., assignors to General Aniline & Film Corporation, New York, N.Y., a corporation of Delaware No Drawing. Application February 11, 1957
Serial No. 639,194

6 Claims. (Cl. 260—314.5)

The present invention relates to an improved process of conditioning crude copper polychloro phthalocyanines to phthalocyanine pigments of finer physical form and of more desirable yellowish-green shades.

Organic pigments are generally obtained as large coarse crystals or highly agglomerated amorphous masses. If these crystals or masses be applied without further modification they inherently possess very poor application properties and tinctorial values. In order to develop both the potential and working properties of such pigments, it is absolutely necessary to modify their nature so that the particle characteristics are rigidly controlled.

There are available several methods for the treatment or conditioning of crude polychloro copper phthalocyanines, the most important is known as acid pasting which is accomplished by several methods. One method involves solution of the phthalocyanine pigment in concentrated acid followed by precipitation of the pigment by drowning the acid solution in water. Another method involves slurrying the pigment in a large volume of concentrated sulfuric acid to effect appreciable solution followed by precipitation by drowning in water.

Still another method involves the precipitation of phthalocyanine pigments from sulfuric acid solutions in the presence of a water immiscible organic liquid such as, for example, nitrobenzene, toluene, xylene, etc., the amount of the water-immiscible organic liquid being approximately 20% by weight of the pigment. The effectiveness of the process drops off rather sharply with shorter amounts of the water immiscible organic liquid, preferred concentrations however should be at least about 20%. After the precipitated pigment is washed and the acidity neutralized, the organic liquid is stripped off by steam.

A still further method utilizes, in addition to the sulfuric acid and the water immiscible organic liquid, from 5 to 20 parts by weight of sodium sulfate for each 100 parts of sulfuric acid, the sodium sulfate being partly in solution and partly in the form of complex crystals suspended in the acid. Steam distillation is necessary in order to remove the water immiscible organic liquid. It is claimed that the latter process tends to shift the shade of the polychloro copper phthalocyanines.

A very recent method to appear involves the kneading of a doughy mass of crude polychloro copper phthalocyanine in the presence of a non-oxidizing mineral acid until a fine pigment is obtained and subsequently diluted with water. By this method pigments are obtained in a form suitable for pigmentary applications. In addition, the process leads to great economy in processing and gives products of conventional shade.

We have discovered that the latter process, which is fully described in U.S. Patent 2,716,649, and the teachings of which are incorporated herein by reference thereto, can be improved to such an extent that the pigments resulting therefrom possess much greater desirable yellowish-green shades, i.e. yellower than previously established standards of polychloro copper phthalocyanines.

Accordingly, it is an object of the present invention to improve the process described in said patent to obtain better shades which correspond to the best standards of polychloro copper phthalocyanines.

Other objects and advantages will become manifest from the following description.

The foregoing objects are accomplished by the addition of a water insoluble benzenoid neutral liquid into the milling mass during any portion of the process prior to dilution. In other words, the crude polychloro copper phthalocyanine is mixed with concentrated sulfuric acid and charged into any suitable kneading machine such as, for example, a Werner-Pfleiderer mill for a period of time ranging from 10 to 30 minutes. A small quantity, ranging between 2–5% by weight of the pigment of a water insoluble benzenoid neutral liquid is added and the mass kneaded for a period of time ranging from 45 minutes to 2½ hours. It is then discharged into a large volume of water with vigorous agitation. The resulting slurry is filtered and the cake washed free of acid. The pigment coloring matter is distinctly yellower than the green pigments normally prepared by any one of the aforementioned processes without the addition of immiscible solvents.

In practicing the present invention, 1 part by weight of crude polychloro copper phthalocyanine is charged with 2 to 4.5 parts by weight of sulfuric acid having a concentration ranging from 93.5–98% into any suitable kneading machine. The mass is kneaded for a short period of time, usually from 10 to 45 minutes, and thereafter 2–5% by weight of a water insoluble benzenoid neutral liquid based on crude pigment added and the mass kneaded for an additional period of time ranging from 45 minutes to 2½ hours. Thereafter the kneaded mass is discharged into a volume of water containing from 30 to 45 parts by weight of water with vigorous agitation. The slurry, which results after agitation ceases, is filtered by any suitable means and the cake washed with water or dilute caustic soda until free of acid.

As examples of suitable water insoluble benzenoid neutral liquids which may be employed, the following are illustrative:

Toluene
Xylene
p-Cymene
o-Dichlorbenzene
Nitrobenzene

Inasmuch as a very small amount of the neutral water insoluble benzenoid neutral liquid is employed in the instant process, there is no need for its removal by steam distillation or other physical means. It is interesting to note that in lieu of a water insoluble benzenoid neutral liquid, we may also employ in an amount ranging from 10 to 30% by weight of a sulfonated aromatic solvent based on crude pigment. As illustrative examples of such materials, the following may be mentioned:

p-Toluene sulfonic acid
Xylene sulfonic acid
p-Cymene sulfonic acid

It is further interesting to note that either the presence of the sulfonated or unsulfonated aromatic solvent during the acid milling process yields the shifting of the color to more desirable yellowish-green shades. Without the presence of either one of these components the shades of the treated phthalocyanines would be average and comparable to commercially available standards. The mechanism of this surprising change in shade is not clearly understood by us. As a matter of conjecture, it is possible that the aggregation or agglomeration of the pigment during dilution, or the particle size distribution during milling or kneading, is affected. It is to be clearly understood, however, that we do not wish to limit ourselves in our description nor to the appended claims by this or any other hypothesis that may be evolved.

The following examples will further illustrate the invention claimed and show the preferred embodiments. It is to be further understood that these examples are merely illustrative and the appended claims should not be restricted thereto. All the parts given are by weight unless otherwise noted.

*Example I*

100 parts of crude polychloro copper phthalocyanine and 300 parts of sulfuric acid of 95% strength were charged into a Werner-Pfleiderer type mill. In this connection it is to be observed that any apparatus or kneading machine which introduces uniform shearing by mixing may be employed. In other words, the kneading machine may be of any type which is capable of exerting a substantial uniform shearing action throughout the pigment-acid mass during milling or kneading. The mass was kneaded for 15 minutes and thereafter 3 parts of nitrobenzene added and the mass kneaded for an additional one hour. The mass was then discharged into 3500 parts of water with vigorous agitation. The slurry which resulted was filtered and the cake washed with water until free of acid. The resulting pigment dyestuff possesses a more desirable yellowish-green shade and is much yellower than an established standard. The pigment dyestuff can be employed without further process or flushing into oleoresinous vehicles, or dried into a powder or converted into a water dispersible paste by mixing the presscake with any currently available surface active agents of the anionic or non-ionic type. In view of its desirable yellowish-green shade and fine physical form, it is particularly adaptable for use in paints, enamels, inks, plastics and the like.

*Example II*

100 parts of hexadecachloro copper phthalocyanine and 350 parts of sulfuric acid of 97% concentration were charged into a Werner-Pfleiderer mill with agitation for approximately 15 minutes. 5 parts of toluene was added and the mass kneaded for an additional ½ hour. The mass was then discharged into 4000 parts of water with vigorous agitation, filtered and washed free from acid. The resulting pigment dyestuff showed the same shift towards the yellow side as in Example I.

*Example III*

100 parts of polychloro copper phthalocyanine and 250 parts of sulfuric acid of 96% concentration were charged into a Werner-Pfleiderer mill with agitation for approximately 15 minutes. 15 parts of p-toluene sulfonic acid was added and the mass kneaded for an additional 30 minutes. The mass was discharged into 2000 parts of water with vigorous agitation, filtered and washed free of acid. The pigment dyestuff thus obtained showed a distinct shift towards the yellow side when compared to a standard and to a crude phthalocyanine similarly prepared without the addition of p-toluene sulfonic acid.

*Example IV*

100 parts of polychloro copper phthalocyanine and 360 parts of sulfuric acid of 95% concentration were charged into a Werner-Pfleiderer mill. 4 parts of xylene was added and the mass kneaded for 2 hours. The mass was then discharged into 4000 parts of water with vigorous agitation, filtered and washed free of acid. The pigment dyestuff thus obtained also showed a distinct shift towards the yellow side when compared to a phthalocyanine green which was prepared without the addition of xylene to its acid milling mass.

We claim:
1. In a process of producing polychloro copper phthalocyanine pigments which comprises milling by kneading with forces predominately shearing in nature a mixture of crude polychloro copper phthalocyanine and sulfuric acid to produce a kneadable mass, the improvement which yields yellower shades of phthalocyanine green pigments comprising admixing with the kneadable mass an aromatic liquid selected from the class consisting of water insoluble benzenoid neutral liquid and a sulfonated aromatic liquid, the said neutral liquid being employed in a quantity ranging from 2–5% by weight of the crude pigment, the said sulfonated aromatic liquid being employed in a quantity ranging from 10 to 30% by weight of the said crude phthalocyanine, and drowning the milled mixture in water and recovering the improved pigment from the water slurry.

2. The process according to claim 1 in which the sulfuric acid concentration ranges from 93.5 to 98%.

3. The process according to claim 1 in which the ratio of sulfuric acid to crude phthalocyanine is 4.5–2:1 by weight.

4. The process according to claim 1 in which the water insoluble benzenoid neutral liquid is nitrobenzene.

5. The process according to claim 1 in which the water insoluble benzenoid neutral liquid is p-toluene.

6. The process according to claim 1 in which the sulfonated aromatic liquid is p-toluene sulfonic acid.

References Cited in the file of this patent

UNITED STATES PATENTS

| | | |
|---|---|---|
| 2,359,737 | Lacey et al. | Oct. 10, 1944 |
| 2,486,304 | Loukomsky | Oct. 25, 1949 |
| 2,534,672 | Lecher et al. | Oct. 3, 1950 |
| 2,540,775 | Brouillard et al. | Feb. 6, 1951 |
| 2,765,318 | Gross | Oct. 2, 1956 |